(12) United States Patent
Soscia

(10) Patent No.: US 6,441,921 B1
(45) Date of Patent: Aug. 27, 2002

(54) SYSTEM AND METHOD FOR IMPRINTING AND READING A SOUND MESSAGE ON A GREETING CARD

(75) Inventor: Peter P. Soscia, Geneseo, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/099,616

(22) Filed: Jun. 18, 1998

Related U.S. Application Data

(63) Continuation-in-part of application No. 08/959,036, filed on Oct. 28, 1997.

(51) Int. Cl.$^7$ .............................................. G06F 13/00
(52) U.S. Cl. ..................... 358/1.9; 358/452; 358/537
(58) Field of Search ........................ 358/1.5, 1.9, 1.12, 358/1.13, 1.14, 1.15, 448, 452, 453, 537; 704/7, 201, 212, 221, 235, 503; 360/55, 77.03, 131; 396/310, 311, 312; 369/86, 14, 112, 315

(56) References Cited

U.S. PATENT DOCUMENTS

| | | | |
|---|---|---|---|
| 3,594,937 A | 7/1971 | Luchsinger | 40/124.03 |
| 3,970,803 A | 7/1976 | Kinzie, Jr. et al. | 369/64 |
| 4,270,853 A | 6/1981 | Hatada et al. | 396/33 |
| 4,488,679 A | 12/1984 | Bockholt et al. | 235/469 |
| 4,570,250 A | 2/1986 | Gabritsos | |
| 4,791,741 A | 12/1988 | Kondo | 704/272 |
| 4,964,167 A | 10/1990 | Kunizawa et al. | 704/260 |
| 5,063,698 A | 11/1991 | Johnson et al. | 40/124.03 |
| 5,128,528 A | 7/1992 | Heninger | |
| 5,483,052 A | 1/1996 | Smith, III et al. | 235/462.49 |
| 5,644,557 A * | 7/1997 | Akamine et al. | 369/14 |
| 5,896,403 A * | 4/1999 | Nagasaki et al. | 369/14 |
| 6,044,348 A * | 3/2000 | Imade et al. | 704/278 |

FOREIGN PATENT DOCUMENTS

| | | |
|---|---|---|
| FR | 2494873 | 5/1983 |
| WO | WO 93 18478 A | 9/1993 |

OTHER PUBLICATIONS

'Optical Sheet Memory System' by Shinji Ohyama et al Electronics and Communications in Japan Part II—Electronics, vol. 75, No. 4, Apr. 1, 1992 pp. 73–84.

* cited by examiner

Primary Examiner—Mark Wallerson
(74) Attorney, Agent, or Firm—Walter S. Stevens

(57) ABSTRACT

Both a system and method for optically imprinting and reading sound data onto a piece of printed sheet material such as a greeting card is provided. The system includes an encoding device for converting a sound message into a two-dimensional encodement, a printer for invisibly imprinting the encodement onto the greeting card, and a reader for optically reading the encodement and converting it into a sound corresponding to the message. The encoding device preferably converts the sound message into a compressed digitized form prior to its ultimate conversion into a two-dimensional encodement. The reader preferably includes a lens for focusing an image of the encodement onto the image sensor array. The sensor array responds to the image by generating a digital signal representative of the compressed sound that the reader decompresses and renders into an analog sound signal which is representative of the original sound image. Both the system and method are particularly useful in providing an individualized sound message on customized greeting cards.

20 Claims, 6 Drawing Sheets

SYSTEM AND METHOD FOR IMPRINTING AND READING A SOUND MESSAGE ON A GREETING CARD

CROSS-REFERENCE TO RELATED APPLICATIONS

This application is a continuation-in-part of U.S. application Ser. No. 08/959,036 filed Oct. 28, 1997.

FIELD OF THE INVENTION

This invention generally relates to the imprinting and reading of sound data on a piece of printed sheet material, and is specifically concerned with the optical reading of an invisibly printed sound message on a greeting card.

BACKGROUND OF THE INVENTION

Techniques for incorporating sound messages into greeting cards are known in the prior art. An example of such a device is disclosed in U.S. Pat. No. 5,063,698. Here, the user records a message into a telephone answering machine which the vendor of the card then encodes into a small, battery operated playback device installed in the card. When the card is opened, a switch may be depressed to activate playback of the sound message. A similar recording and playback device for use in a postcard is disclosed in U.S. Pat. No. 4,791,741.

While such prior art techniques certainly enhance the personalization of a greeting card or postcard, they are accompanied by a number of drawbacks. First, despite ongoing progress in the miniaturization of electronic components, such playback devices are relatively large and bulky relative to the sheet material that forms the card, and hence interfere with the aesthetics of the card by providing either an unsightly bulge or unwanted thickness along at least a portion of the card. To minimize the aesthetic intrusiveness of such modules, they are manufactured in as compact and lightweight a form as possible. However, the resulting small and lightweight structures of such modules necessarily limits the quality of the sound they produce, and renders them fragile and susceptible to breakage when conveyed through the various machinery of the postal service. Thirdly, the power cells used in such modules are likewise necessarily small and of limited power capacity, which in turn limits the module to a relatively short lifetime of operation.

It is also known to provide sound data on other forms of written or image bearing sheet material which is optically read by a hand-held device. For example, U.S. Pat. No. 3,970,803 discloses a system where a sound track is formed from a series of visible segments is printed over selected portions on the pages of a publication, such as a book. An optical scanner is provided which, when slid over the sound tracks, converts the sound track to sound. Similarly, French patent 2,494,873 discloses the use of a visibly printed bar code onto sheet music. A so hand-held stylus-like decoder reads the bar code when swiped over it in order to produce sounds representative of the musical notes on the sheet music.

However, in both of these inventions, the conspicuous visibility of the printed sound track or bar code is not only unsightly, but visually distracting which is particularly problematical in the sheet music disclosed in the French '873 patent. While invisible inks are known, the necessary scanning motions that the system operator must execute in order to read the sound track or bar code necessitates that the printed representation of the sound data in these inventions be easily seen for proper alignment between the scanner and track or code. Finally, because of the required alignment between the sound track or bar code and the head of the scanning mechanism during the scanning movement, there is a possibility that the sound reproduction in either of these two prior art systems may be either unreliable or distorted due to inaccurate alignment.

It is also known to adhere a magnetic recording strip onto a photographic print for the storage of a sound message or commentary directly on the print. Such a system is disclosed in U.S. Pat. No. 4,270,853. However, such a system provides limited storage space and uses up available image space when placed on front of the print. Moving the magnetic strip to the back of the photographic print reduces its accessibility and makes it awkward to reproduce the sound while viewing the print. Moreover, this system requires a magnetic reader head that must be swiped along the longitudinal axis of the magnetic strip in accurate alignment therewith for the sound message to be played back with any degree or reliability and accuracy.

Clearly, there is a need for a technique for providing a personalized sound message on a greeting card, postcard, or other written message which does not rely upon electronic modules that create unwanted thicknesses in the card sheet material or unsightly bar codes or magnetic strips. Ideally, such a system would be capable of incorporating a high-quality sound recording directly on the surface of the card in an easy, inexpensive and visually unintrusive manner. The available message length should be as long as possible to accommodate sound messages of long duration. Finally, the system should allow for the playback of such a sound message in an easy and reliable manner which does not rely upon sweeping or scanning movements that must be critically aligned with a bar code or magnetic strip.

SUMMARY OF THE INVENTION

Generally speaking, the invention is a system and method for optically imprinting and reading sound data from a printed piece of sheet material, such as a greeting card that overcomes the shortcomings associated with the prior art. The system comprises an encoding device for converting a sound message into a two-dimensional encodement, a printer for invisibly imprinting the encodement onto a piece of sheet material, and a reader including an image sensor array for optically and remotely reading the encodement and converting it into sound corresponding to the message without the need for a swiping or scanning movement.

The encodement may be printed directly onto the printed sheet material, or onto a different, transparent sheet of material that is adhered or otherwise secured onto the printed sheet material. Where the piece of sheet material includes an imprinted image or design, the encodement may be invisibly integrated into such image or design. Such invisible integration allows the use of infrared dyes that would be faintly perceptible if printed against a blank, light background while still preventing the encodement from becoming a visual distraction on the greeting card or postcard that the system or method is applied to.

The encoding device preferably includes a digitizer for converting an analog sound system into digital data, a compressor circuit for compressing the digital sound data, and a circuit for rendering the compressed digital sound data into a two-dimensional encodement. The printer preferably imprints the two-dimensional encodement onto the piece of sheet material in a manner that is invisible to the human eye.

The printer can either print the encodement onto the piece of printed sheet material, or onto another piece of sheet material (which may be transparent) which is subsequently secured onto the printed material. The reader may include a lens for focusing an image of the encodement onto the image sensor array to allow it to be remotely read. The image sensor array may be either a two-dimensional array or a combination of a linear array and a movable mirror which sweeps the focused encodement image across the array in such a manner as to obviate the need for a sweeping movement of the reader. The reader may also include a decompression circuit for converting digital data received by the image sensor into an analog sound signal representative of the original sound message, as well as a speaker for converting the analog sound signal back into sound.

The method of the invention includes the steps of recording a sound message, converting the sound message into a two-dimensional compressed encodement, invisibly imprinting the encodement onto a greeting card or a postcard or other written message, and then optically reading the encodement from the greeting card by focusing an image of the encodement onto an image sensor array. The image sensor array responds to the focused image by generating a compressed digital sound signal which is decompressed into an analog sound signal and converted into sound representative of the sound message.

The message recordation step may be implemented by remotely transmitting a sound message through any remote voice communication system, such as a telephone, radio, or internet. The message recorded may originate from a microphone, another recording device such as a tape recorder, or the sound recording of a camera having such a capacity, an audio CD or CD-ROM, or even a remote sound library. The method of the invention may further include the step of augmenting and editing the sound message prior to the conversion of an analog sound signal representative of the sound message into a compressed digital signal. The addition of such a step finds particular utility in a greeting card customizing kiosk, where the user might wish to mix sounds (such as background music) with a verbal message that is imprinted onto the greeting card or other type of communication.

DETAILED DESCRIPTION OF THE PREFERRED EMBODIMENT

Figure 1:
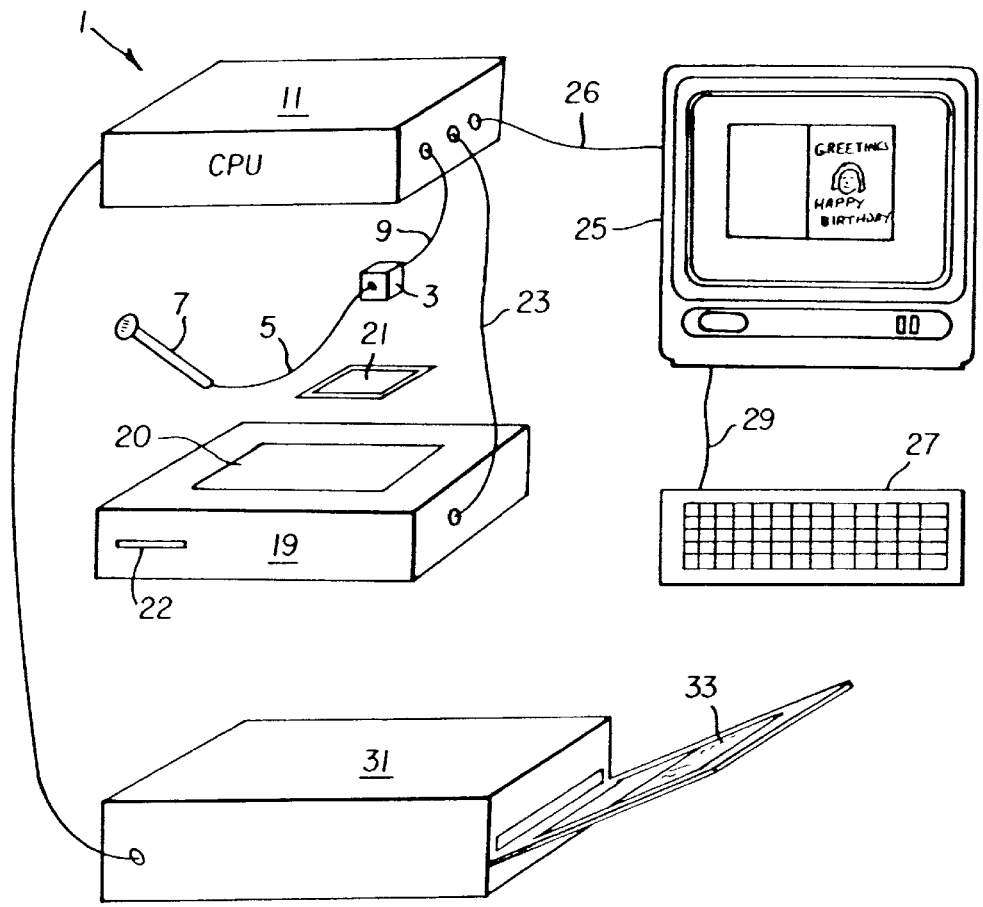
FIG. 1 is a schematic diagram of a greeting card printing station that includes an encoding circuit and a printer for invisibly printing a sound message onto a greeting card.
Figure 2:
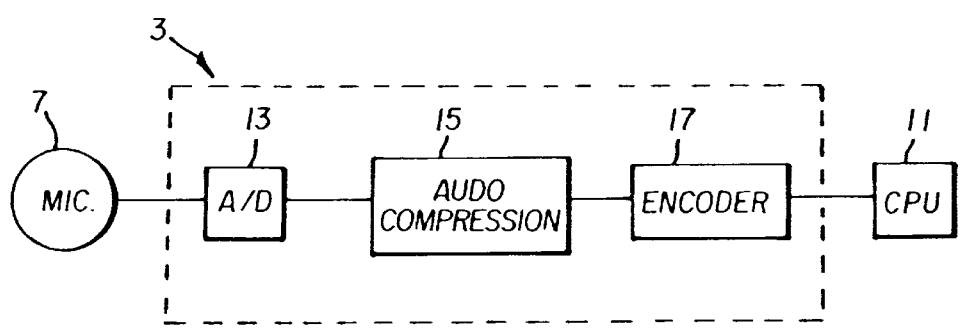
FIG. 2 is a schematic diagram of the encoding circuit illustrated in FIG. 1.

With reference now to FIGS. 1 and 2, wherein like numbers designate like components throughout all the several Figures, the sound encoding components of the invention may easily be integrated into a greeting card printing station 1. The station 1 may include a sound encoding circuit 3 having an input cable 5 connected to a microphone 7, and an output cable 9 connected to a central processing unit 11. The unit 11 may be, for example, any one of a number of PC-type computers.

With reference now to FIGS. 1 and 2, the sound encoding circuit 3 includes an analog to digital converter 13 for receiving an analog signal from the microphone 7 via cable 5 and for converting this signal into digital sound. Encoding circuit 3 further includes an audio compression module which reduces the amount of digital data required to represent the audio signal received from the microphone 7. Audio compression module 15 may be, for example, an AMBE-1000 Voice Coder manufactured by Digital Voice Systems, Inc. Such modules are capable of reducing the amount of data necessary to represent the analog signal received from the microphone 7 by about a 10 to 1 ratio. The encoding circuit 3 also includes an encoder 17 which translates the compressed digital data received by the audio compression module 15 into a two-dimensional data array such as, for example, AIM Standard PDF 417. Software and hardware for encoding and arranging the data according to such a standard is obtainable from Symbol Technologies, Inc., as part of a LS 49042D Scanner System. Another example is an encodement known as "Data Strip" available from Data Strip Corporation. An even more preferred encodement is commercially available under the trade name "Paper Disk" from Cobblestone Software, Inc. located in Lexington, Massachusetts. "Paper Disk" encodement is preferred due to its robustness; i.e., its scheme of providing redundant information at different locations within the encodement area. It is also preferred due to its ability to be optically decoded without error when skewed, i.e., when tilted at an angle of between 15 and 20° from perpendicular with respect to the center line of the lens used in the optical reader (described hereinafter).

Greeting card printing station 1 may also include an image scanner 19 of the type used in the "Kodak Image Magic Picture Maker" manufactured by Eastman Kodak located in Rochester, N.Y. Such an image scanner 19 includes a glass panel 20 where a photograph 21 may be supported for an image scanning operation. Scanner 19 also includes a slot 22 for receiving images from CD-ROM. While not specifically indicated in FIG. 1, scanner 19 is also capable of receiving images from floppy discs, and rendering positive images from negative film. In all cases, the electronic circuits of the scanner 19 translate an image into a formatted scheme of digital data which is transmitted to the central processing unit 11 via a cable 23.

The greeting card printing station 1 further includes a display monitor 25 having a CRT tube in combination with the user keyboard 27 interconnected via a cable 29. The display monitor 25 displays all of the various formatting, print content, print font, and imaging options open to the operator of the printing station 1, as well as a precise representation of how these various visual options will appear on the final printed card. While the station 1 is illustrated as having a keyboard-type interface 27, it may optionally use a "touch screen" type interface. It should be noted that all of the various card editing options are stored in the memory of the CPU 11, whose output is connected to the display monitor 25 via a cable 26.

Finally, the greeting card printing station 1 includes a printer 31 for printing the final format of the card selected on the display monitor 25 onto an appropriate piece of sheet material. In the preferred embodiment, printer 31 may be an XLS 8650 digital color printer manufactured by the Eastman Kodak Company located in Rochester, N.Y. Such a printer is fully capable of not only rendering high quality color images with cyan, yellow, and magenta inks printed in a fine pixelated form, but is also capable of printing infrared dyes in the aforementioned encodement pattern which are completely or nearly invisible to the human eye.

Figure 3:
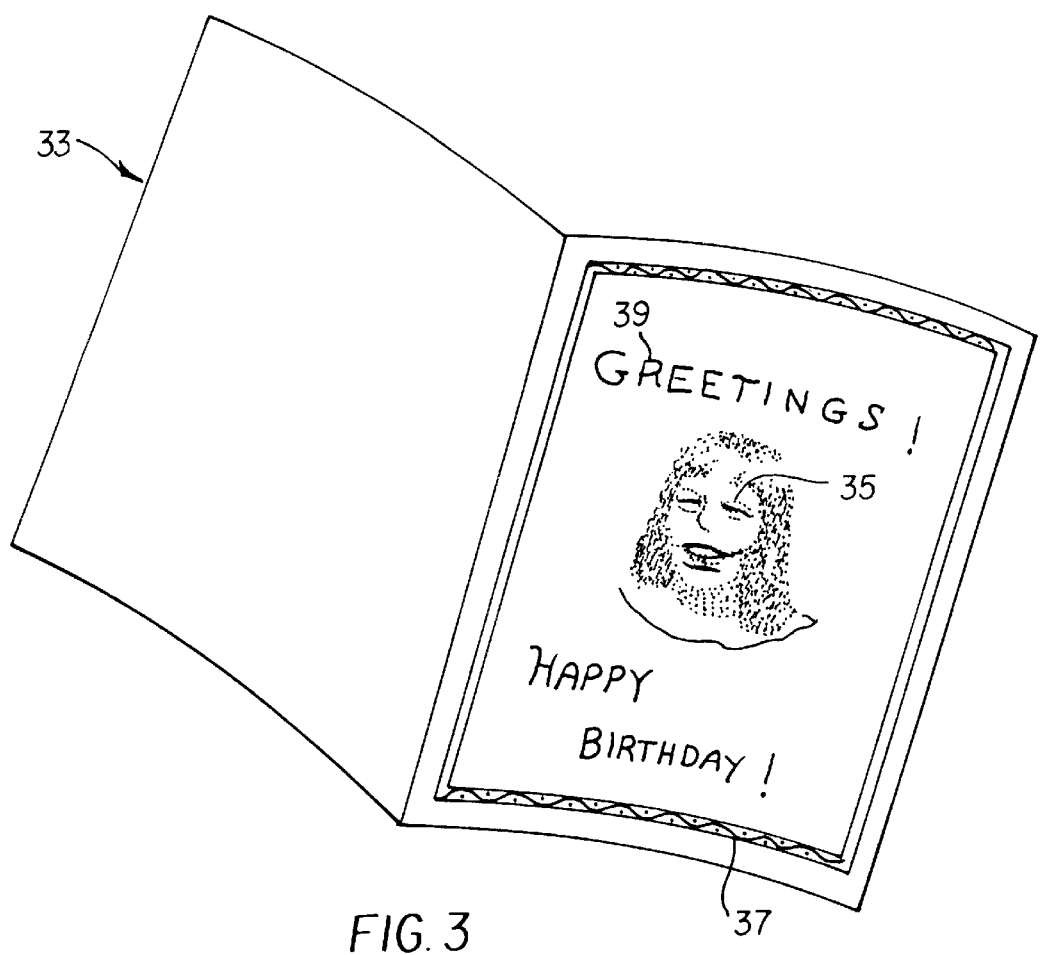
FIG. 3 is a drawing of a greeting card produced by the printer illustrated in FIG. 1.
Figure 5:
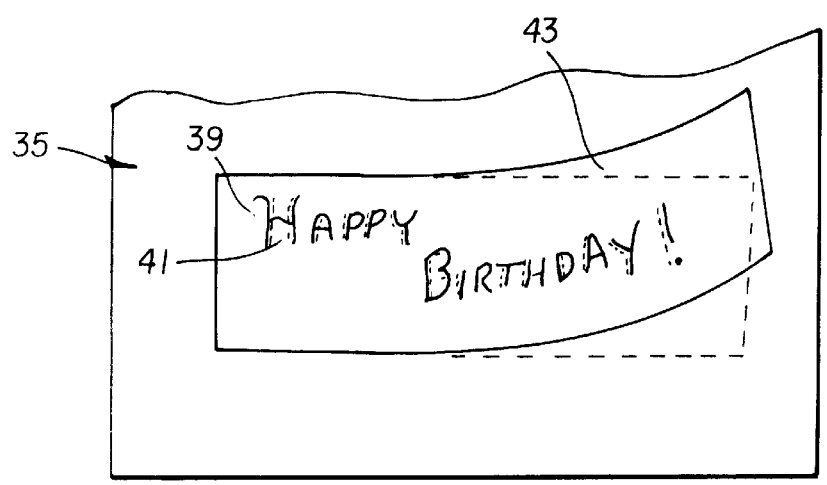
FIG. 5 illustrates how the sound encodement may be invisibly imprinted on a transparent sheet material which is subsequently secured onto a greeting card.
Figure 4A:
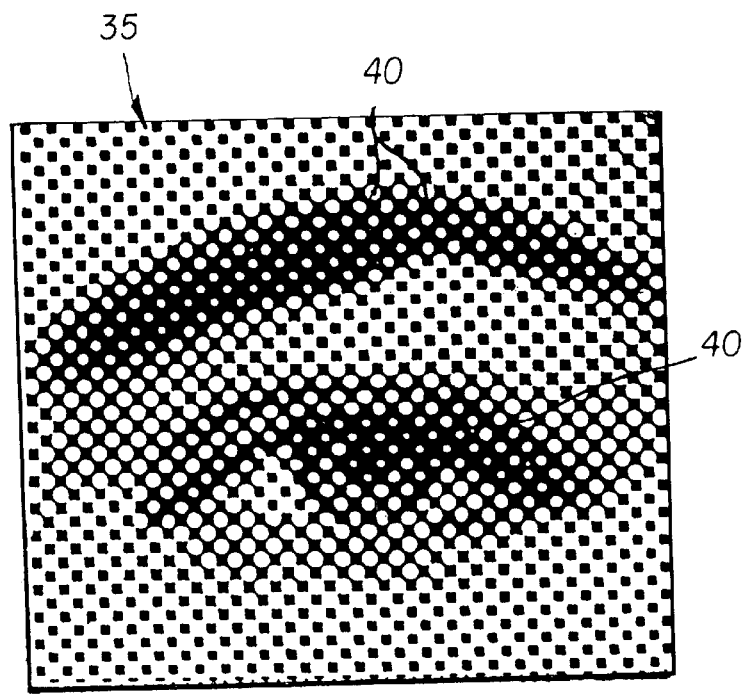
FIGS. 4a and 4b are enlargements of image areas of the greeting card illustrated in FIG. 3, illustrating how selected portions of the image area are invisibly encoded with a sound message.
Figure 4B:
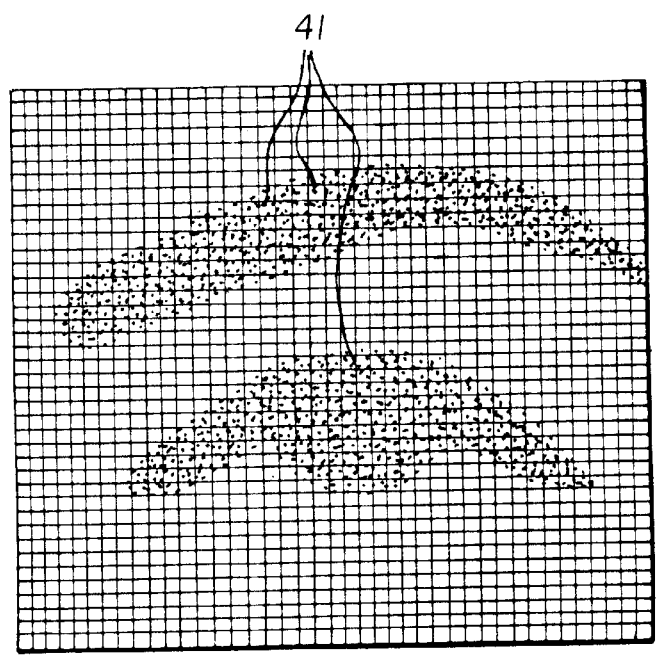

FIGS. 3, 4a and 4b illustrate not only the sound-encoded greeting card produced by the station 1, but the manner in which the printer 31 imperceptibly prints the sound encodement onto the face of the card 33. Card 33 may includes image areas 35 generated by the photograph 21 or other image recording medium run through the scanner 19 of the greeting card printing station 1. Card 33 may further include design areas 37 the form of artistic borders or other patterns that are selected by the system operator and printed on the card 33 to enhance appearance. Finally, the card 33 may have printed areas 39 carrying written greetings, messages, or other information selected by the user of the printer station 1. In the preferred embodiment, the sound message encodement is preferably printed in at least one of the various image, design, or printed areas 35, 37, and 39 as the darker portions of these areas provides a situs for the imperceptible printing of, for example, infrared inks.

Inks that are highly active in the infrared spectrum may include, as a principal component, an indium and tin mix oxide. While such inks are largely neutral with respect to visible light, they are not entirely so; many display a light yellowish green color that is distinctly visible to the naked eye, particularly when printed over a substantially white background. However, such inks may be imperceptibly integrated into the darker areas 40 in, for example, an image area 35, as is specifically shown in FIG. 4b. Such an imperceptible printing may be accomplished by calculating, via the CPU 11, the precise contribution in terms of both color and overall visible light absorbency that the infrared ink will make on everyone of the selected group of pixels once it is overprinted thereon. Since a yellowish green color may be duplicated by the deposition of yellow and cyan inks, the CPU 11 first determines the exact amount of cyan and yellow density values that the overprinting of the infrared ink will apply to each of the pixels carrying audio data. After completing this step, the CPU 11 then calculates the cyan, magenta, and yellow densities for all of the pixels in the image file which are necessary to create the image in true color. In other words, the CPU 11 computes the precise number of cyan, magenta, and yellow density units that will have to be deposited onto each of the pixels in the image area 35 in order to obtain the proper "target" color for each pixel. After completing this step, the CPU 11 then subtracts the cyan, magenta, and yellow density units computed when determining the color contribution of the yellowish green infrared ink when the ink is overprinted onto the image area 35.

Once this step has been completed, the image area 35 will be printed in "true" color after the printer 31 prints all of the image pixels in cyan, magenta, and yellow dye, and then overprints the image area 35 with infrared ink since the CPU 11 now relies upon the light, yellowish green contribution of this ink to complete the image in "true" color. Since this process has the consequence of eliminating any visible contrast between the infrared dye and the image area 35, the encoded areas 41 printed onto the image area 35 by the infrared ink are completely imperceptible to the human eye. This particular aspect of the invention is explained in more detail in U.S. patent application Ser. No. 08/959,036 filed Oct. 28, 1997 assigned to the Eastman Kodak Company, the entire specification and claims of which are incorporated herein by reference.

Figure 6:
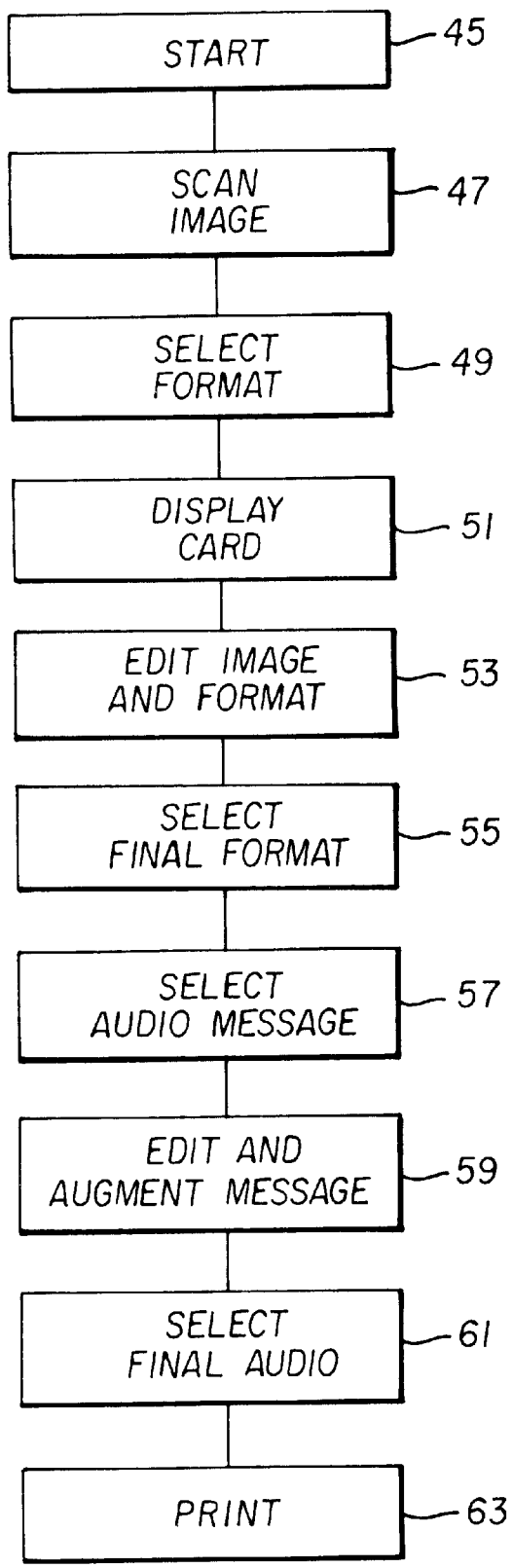
FIG. 6 is a flow chart illustrating a method of operating the greeting card printing station illustrated in FIG. 1 in order to generate the sound encoded greeting card illustrated in FIG. 3.

FIG. 6 illustrates the method of operating the greeting card printing station illustrated in FIG. 1. The method is initialized at the start step 45 by activating all of the components of the system. Next, the photograph 21 or other image is scanned by the scanner 19, as is indicated in step 47. This step results in the scanner 19 converting the image into a two-dimensional array of digital data, and transferring this data into the memory bank of the CPU 11. Next, the user of the system 1 selects, from the message, print font, and design choices displayed on the monitor 25, a format for the greeting card, as is indicated in step 49. In the next step of the method, the user commands the CPU to display a card bearing both the selected format and the image scanned by the scanner 19. The CPU responds by displaying a "rough draft" of the card onto the monitor as is indicated in step 51. In the next step 53, the user edits both the image and the format in accordance with the system options available. Such editing may involve the enlargement or reduction of the image, the vignetting of the image, the selection of different spatial arrangements between the image and the written greeting, etc. At the end of this step, the user selects a final format, as is indicated in step 55.

Next, the user selects the audio message which he or she wishes to invisibly print onto the card, as is indicated in step 57. Typically, this would involve recording a personalized message of a designated duration through the microphone 7. The limit of the message duration may be set, for example, at 10 seconds. As is indicated in step 59, the user then edits and augments the audio message. Step 59 may involve, for example, making the message longer or shorter, or adding other sounds to the message (such as background music) contained with a sound recordation data bank within the CPU 11. The user then selects the final version of the audio message, as is indicated at step 61. He then commands the printer 31 to print the final card 33, which contains the audio message in an invisibly printed form as previously described.

Figure 7:
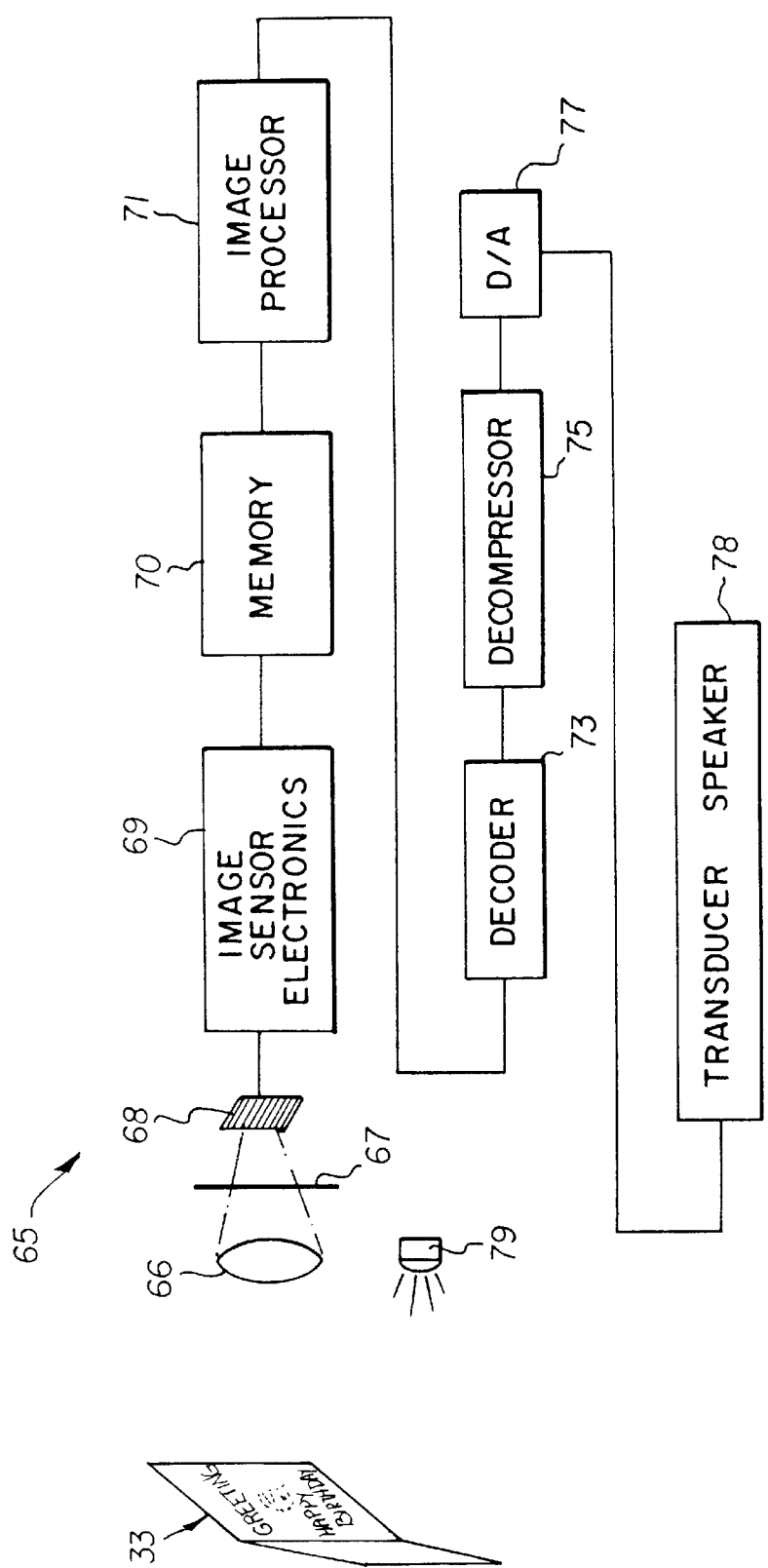
FIG. 7 is a blocked diagram of a circuit of a reader that optically reads the invisibly encoded sound message in the greeting card illustrated in FIG. 3.

FIG. 7 illustrates the optical reader component of the system of the invention which operates to optically scan the invisibly imprinted message in the greeting card 33, and to convert it into a sound message. To this end, the reader includes a lens assembly 66 for focusing an image of the invisibly imprinted encodement onto a two-dimensional sensor array 68 through a spectral filter 67 (which may be coated directly onto one of the surfaces of the lens assembly 66). The spectral filter is tuned to a wavelength that enhances contrast between the infrared dye and the background, whether the dye is absorptive or fluorescent. The image sensor array may be, for example, a video graphics array (VGA) sensor having a resolution of 640 by 480 pixels of a type well known in the art, or a higher resolution 16 mega pixel model KAF-6300 manufactured by the Eastman Kodak Company located in Rochester, N.Y. The use of a two-dimensional image sensor is preferred since it can capture the entire two-dimensional data array within the invisibly imprinted encodement without the user being required to move the reader in a scanning motion over the greeting card 33. The reader further comprises image sensor electronics 69, a memory 70, an image processor 71, a decoder circuit 73 which converts the two-dimensional array of data back into a digital data stream, a decompressor circuit 75 for decompressing the digital data stream back into a stream representative of the sound data prior to compression by the circuit 15 and a digital to analog converter 77 that converts the digital data stream received from the circuit 75 back into an analog sound signal. Finally, the reader includes a transducer/speaker circuit 78 which converts the analog signal into a sound representative of the originally recorded sound through the microphone 7. The reader circuit 65 is essentially the same as that described and claimed in U.S. patent application Ser. No. 08/931,575 filed Sep. 16, 1997 by the Eastman Kodak Company, the entire specification and claims of which are incorporated herein by reference.

Optionally, an auxiliary light source 79 may be used in conjunction with the optical reader circuit 65 to enhance the sensitivity of the reader circuit 65 in reading the encodement on the greeting card 33.

Figure 8:
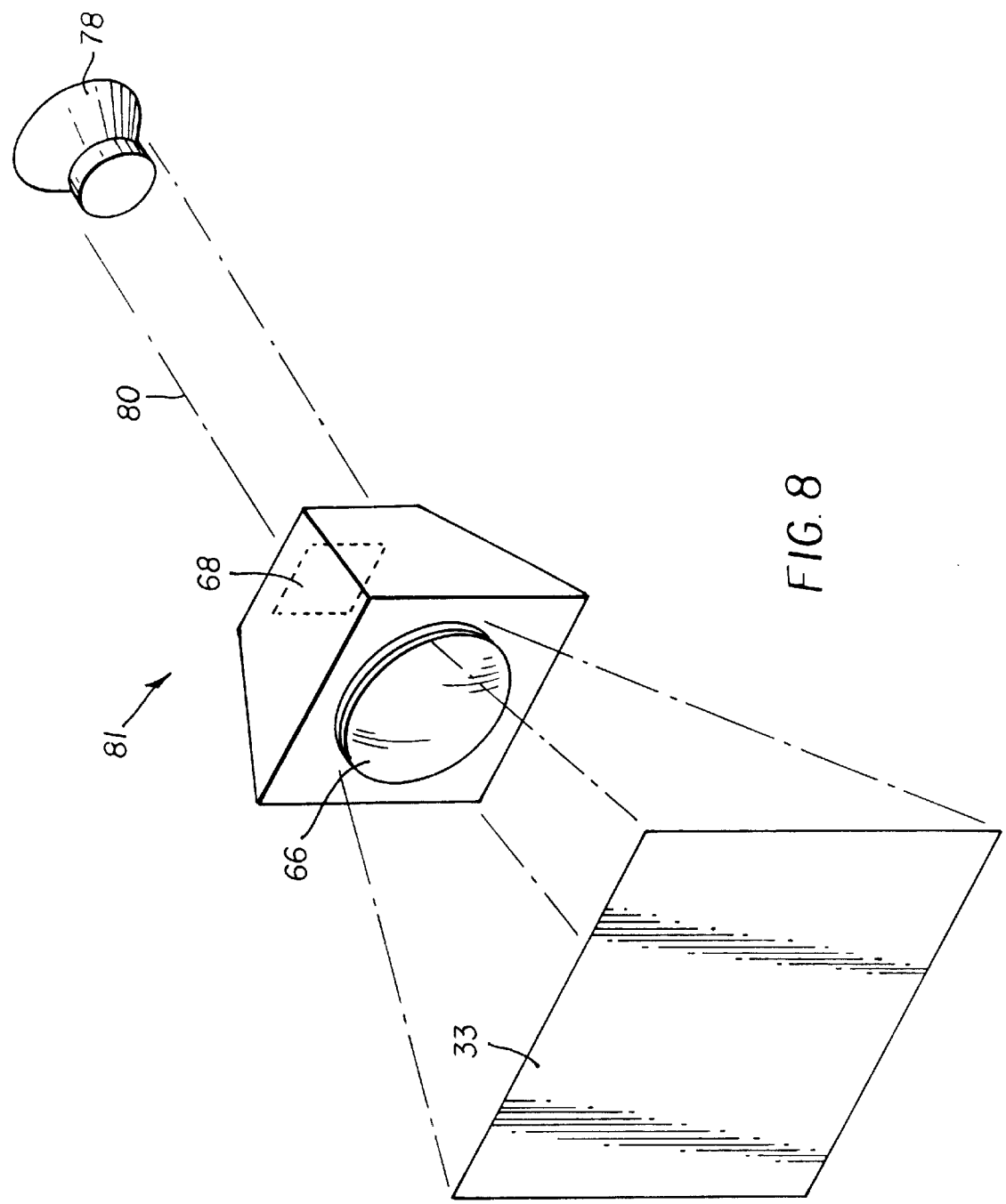
FIG. 8 is a perspective drawing of a hand-held arrangement of the optical reader of the invention.

Preferably the optical reader circuit 65 is battery operated and assembled within a cylindrical housing 80 so as to render the entire reader assembly 81 as easily portable as a common flashlight, as is shown in FIG. 8.

While both the system and method of the invention have been described with respect to a specific embodiment, various additions and modification will become apparent to persons of ordinary skill in the art. For example, while the sound message may be non-perceptibly encoded into the image design or print areas of the card 33 by way of infrared inks, other invisibly or low visibility inks (i.e., ultraviolet or fluorescent) may be likewise used to implement such an encodement. Alternatively, the encodement may be visible, but "camouflaged" into aesthetic background designs in the greeting card. While the optical scanner assembly 81 is preferably portable, it may also be implemented in stationary form. While a two-dimensional image sensor array is preferred, the combination of a linear sensor array and pivotally movable mirror could likewise be used to create a reader assembly which is capable of "scanning" the image of the encodement without the need for a scanning movement on the part of the system user. All such variations, modification, and additions are included within the scope of this invention, which is limited only by the claims appended hereto.

What is claimed:

1. A printing station for printing audio data and image data upon a recording medium, comprising
    an image input source that generates digital signals of image data of a photograph or other pictorial information;
    an input source for audio information;
    a display monitor for displaying the pictorial information and various formatting, print content, print font, and imaging options available to an operator of the printing station; and
    a color printer for printing a visible image of the pictorial information and an imperceptible image of the audio information, the pictorial information printed by the printer including pictorial information areas that are relatively darker and pictorial information areas that are relatively lighter and the printer preferentially prints the audio information overlying the pictorial information areas that are relatively darker so that the relatively darker areas of the pictorial information upon which the audio information is printed provide camouflage for the imperceptible audio information.

2. The printing station of claim 1 and wherein a controller is provided that calculates respective color densities for pixels in a pictorial image file as modified by contribution of an invisible or nearly invisible dye used for recording the audio information and when the invisible or nearly invisible dye is to be overprinted onto an image area containing pictorial information the controller provides output data to the printer to obtain target color for each image pixel of the visible pictorial image to be printed.

3. The printing station according to claim 2 and wherein the audio information is printed with redundant information at different locations within an encodement area.

4. The printing station according to claim 1 and wherein the audio information is printed with redundant information at different locations within an encodement area.

5. The method according to claim 1 and wherein the pictorial information areas includes a human face and the darker areas over which the audio information is preferentially printed comprises facial hair.

6. The method according to claim 1 and wherein the pictorial information areas includes a human head and darker areas over which the audio information is preferentially printed comprises hair on the head.

7. A method of operating a printing station for recording audio data and image data on a recording medium comprising:
    generating digital data of a photograph or other pictorial image;
    storing the data representing the pictorial image in a memory;
    selecting designs to be printed and a message to be printed through interfacing with a display illustrating such designs and message;
    selecting an audio message to be imperceptibly recorded as a print on the recording medium; and
    recording the pictorial image as a visible pictorial image on the recording medium by printing the pictorial image with visible dye or other visible medium, the visible pictorial image recorded including pictorial image areas having relatively darker areas and pictorial image areas having relatively lighter areas and in the step of recording there is preferentially recorded the audio message as an imperceptible image on the recording medium by printing the audio message in an invisible or nearly invisible dye or other invisible or nearly invisible medium in the pictorial image areas that are relatively darker.

8. The method according to claim 7 and wherein the audio message is printed with redundant information at different locations within an encodement area.

9. The method according to claim 8 and wherein an analog sound signal is converted into a digital audio signal and the digital audio signal is then compressed.

10. The method according to claim 7 and wherein an optical reader operates to optically scan the invisibly imprinted audio message on the recording medium and the output of the reader is converted into an audible message.

11. The method according to claim 10 and wherein the optical reader is a two-dimensional image sensor that can read an area of the recording medium without the need for movement of the image sensor over the recording medium.

12. The method according to claim 11 and wherein the optical reader includes a spectral filter that enhances contrast between the invisible or nearly invisible dye or other invisible or nearly invisible medium and the background upon which the invisible dye or other invisible medium is printed.

13. The method according to claim 11 and wherein a two-dimensional array of data provided by the optical reader is converted into a digital data stream and then decompressed into a stream of data representing sound data and then converted into an analog sound signal.

14. The method according to claim 7 and wherein the audio information is recorded in a border design of the pictorial information.

15. A method of operating a printing station for recording audio data and image data on a recording medium comprising:

generating digital data of a photograph or other pictorial image;

storing the data representing the pictorial image in a memory;

selecting designs to be printed and a message to be printed through interfacing with a display illustrating such designs and message;

selecting an audio message to be recorded as a print on the recording medium; and recording the pictorial image as a visible pictorial image on the recording medium by printing the pictorial image with visible dye or other visible medium and recording the audio message as an image on the recording medium by printing the audio message camouflaged as background patterns of the printed pictorial image.

16. A method of reading an audio message contained on a sheet having a recording of a pictorial image as a visible pictorial image on the sheet and a recording of an audio message, the method comprising:

providing the sheet wherein the pictorial image is printed with visible dye or other visible medium, the pictorial image comprising darker pictorial image areas and lighter pictorial image areas, and the recording of the audio message is provided as an imperceptible printed image an the sheet wherein the audio message is printed in an invisible or nearly invisible dye or other invisible or nearly invisible medium and has been preferentially printed in the darker pictorial image areas to provide camouflage for the audio message;

providing an optical reader that operates to optically scan the audio message on the recording medium and the output of the reader is converted into an audible message and wherein the optical reader is a two-dimensional image sensor that can read an area of the sheet without the need for movement of the image sensor over the recording medium and generate a two-dimensional array of data;

converting the two-dimensional array of data provided by the optical reader into a digital data stream;

decompressing the digital da stream into a stream of data representing sound data; and converting the data representing sound data into an analog sound signal.

17. The method according to claim 16 and wherein the optical reader includes a spectral filter that enhances contrast between the invisible or nearly invisible dye or other invisible or nearly invisible medium and the background upon which the invisible or nearly invisible dye or other invisible or nearly invisible medium is printed.

18. The method according to claim 16 and wherein the pictorial image is recorded on the sheet so that color densities for pixels are modified by contribution of an invisible or nearly invisible dye used for recording the audio message overprinted onto an image area containing the pictorial image so that each image pixel of the visible pictorial image is print ed to target color.

19. The method according to claim 18 and wherein the audio message is printed on the sheet with redundant information at different locations within an encodement area.

20. The method according to claim 16 and wherein the audio message is printed on the sheet with redundant information at different locations within an encodement area.

* * * * *